Patented Aug. 21, 1928.

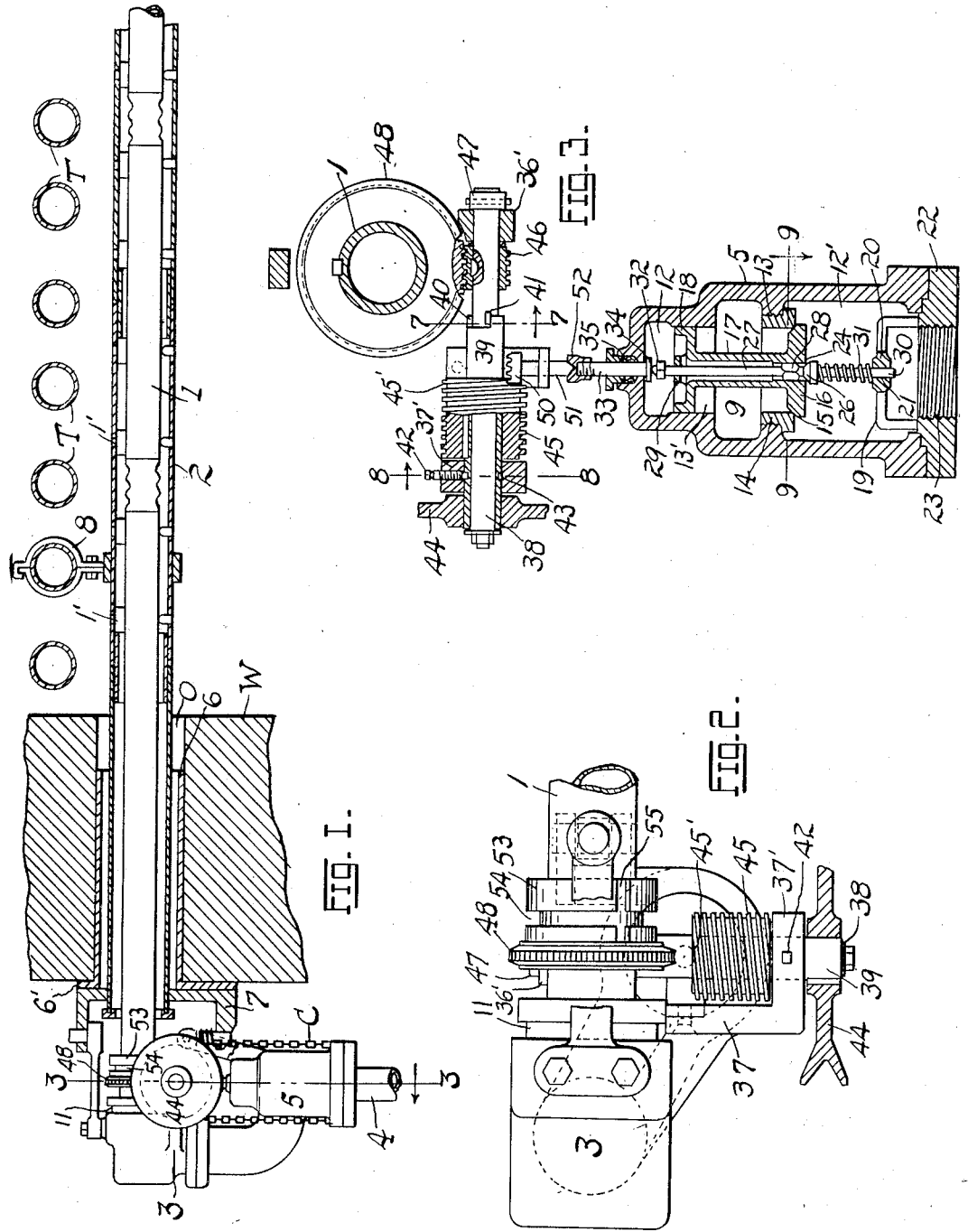

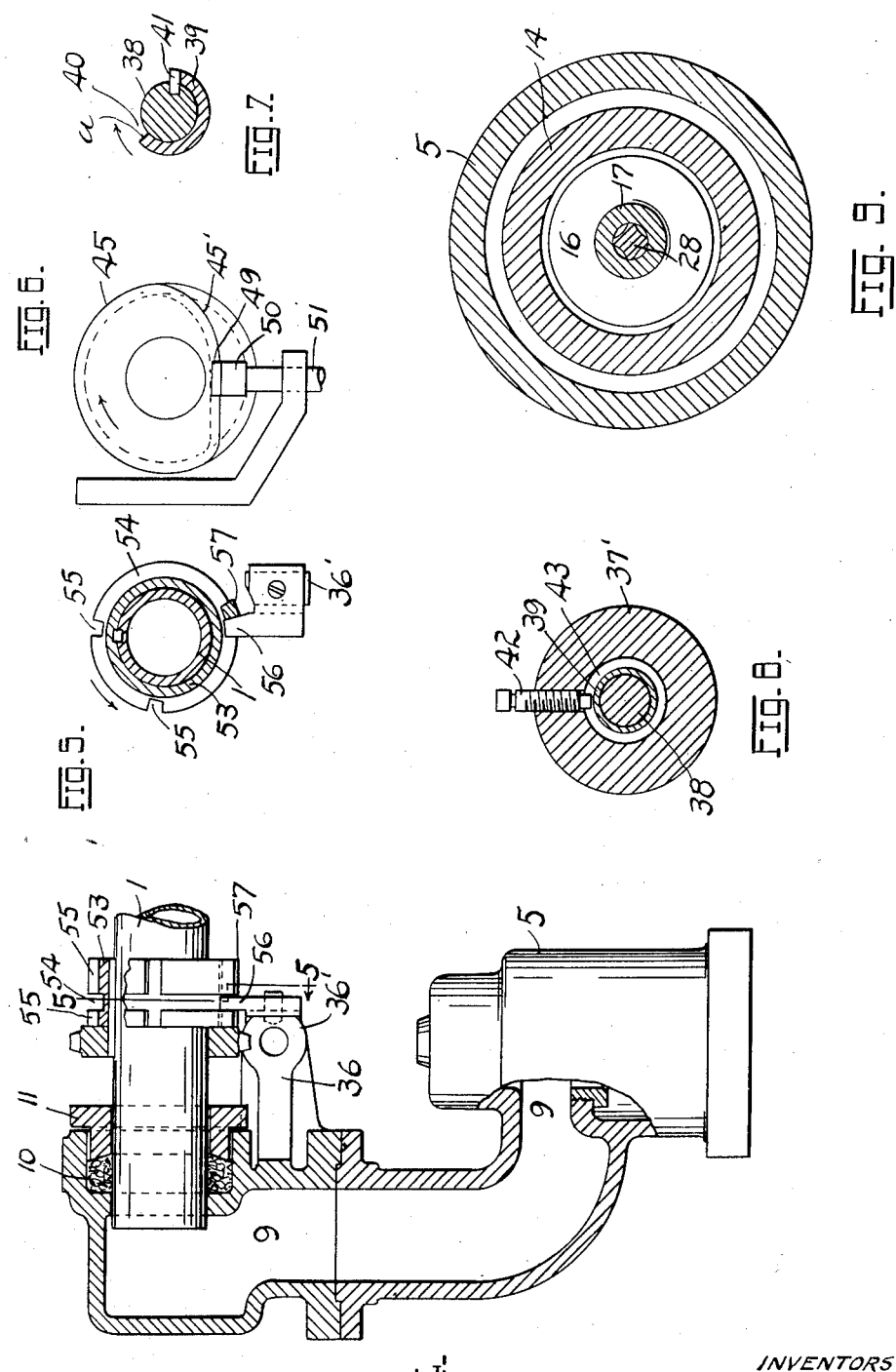

1,681,165

UNITED STATES PATENT OFFICE.

LEO JOHN BAYER AND FRANK A. BAYER, OF ST. LOUIS, MISSOURI.

SOOT BLOWER.

Application filed October 29, 1923. Serial No. 671,436.

Our invention has relation to improvements in soot blowers for boilers and consists in the novel features of construction more fully set forth in the specification and pointed out in the claims.

The present invention is an improvement over that shown in the co-pending application on soot blowers filed May 8, 1922, Serial No. 559,290, and is a novel departure therefrom in that the steam supply valve and blower unit are not co-acting. In the present invention it has been our object to provide independent means for opening the supply valve and rotating the blower unit, so that the valve may be completely opened before the blower unit is moved. In the present soot blowers of this type, called "valve-in-head" blowers, as soon as the valve is operated the blower unit begins to rotate, or has already begun, with the result that for a part of the unit's rotation the valve is only partially opened. As an alternative evil to having the valve only partially open for a part of the blowing arc of the blower unit, the valve may be arranged to open before this arc is reached and stay open until after the blowing arc is passed with the resulting waste of steam or injury to the boiler. By providing a structure, as we do, wherein the valve is fully opened before the blower unit commences to rotate, the rotation of said unit may be confined to the actual blowing arc, and need not be idly rotated for the purpose of allowing the valve to open and close. The manner in which we accomplish this object as well as other advantages of the invention will fully appear in the detailed description of the invention in connection with the accompanying drawings, in which—

Figure 1 is a side elevation of our improved blower shown applied to a boiler, parts being in section; Fig. 2 is an enlarged top plan of the blower head; Fig. 3 is a vertical cross-section of the blower head taken on the line 3—3 of Fig. 1; Fig. 4 is a combined side elevation and section of the blower head with the valve and blower pipe actuating mechanism omitted; Fig. 5 is a cross-sectional detail taken on the line 5—5 of Fig. 4; Fig. 6 is an end view of the valve actuating cam; Fig. 7 is a cross sectional detail of the blower unit actuating mechanism taken on the line 7—7 of Fig. 3; Fig. 8 is a cross-sectional detail taken on the line 8—8 of Fig. 3; and Fig. 9 is a cross-sectional detail taken on the line 9—9 of Fig. 3.

Referring to the drawings, W represents the boiler wall and T the boiler tubes which it is desired to clean. The complete blower comprises a blower unit or element consisting of a blower pipe 1 surrounded by the usual jacket or air pipe 2, a head 3, and a steam supply pipe 4 connected to a valve casing 5 forming a part of the head. The blower pipe 1 has a plurality of jet nozzles 1' distributed along its length. In mounting the blower on the boiler, the boiler wall is first provided with an opening O and a wall sleeve 6 is fitted tightly into this opening, said sleeve having a flange 6' on the outer end into the corners of which is bolted a supporting bracket 7 for the blower head 3. The blower unit is passed through the sleeve 6 and is supported from the boiler tubes by suitable hangers 8. Since this invention is directed exclusively to the blower head 3 the balance of the specification will be restricted to a description of this head.

The head 3 comprises a valve casing 5, and a steam chamber 9 communicating therewith, and the valve and blower unit actuating mechanism to be described hereinafter.

The steam chamber 9 is provided with an enlarged cylindrical portion 10 for receiving the intake end of the blower pipe 1, a stuffing box 11 being provided to make the connection steam tight and at the same time permitting the blower pipe to rotate in the cylindrical enlargement 10.

Within the valve casing 5 is an upper chamber 12, and a lower chamber 12' between which is an annular, threaded shoulder 13 into which is screwed a ring 14 having the bottom edge 15 of its inside wall beveled to provide a seat for the main supply valve 16 about to be described. The valve 16 is provided with a hollow stem 17 projecting into chamber 12, said stem terminating in a guide disc 18 the peripheral surface of which fits snugly against the chamber wall 13' which serves as its guide. Within the lower part of chamber 12' is a spider 19 having a hub 20 provided with an opening 21, said spider forming a part of a flange 22 in which there is a central threaded opening 23 for receiving the steam supply pipe 4. A valve seat 24 is formed on the bottom face of valve 16, said seat being adapted to receive an auxiliary valve 26 the stem 27 of which traverses the hollow valve stem 17, and is guided therein by a polygonal enlargement 28 adjacent the valve 26, the upper end of the stem 27 passing through an opening in a guide arm 29 formed on disc 18. The auxiliary valve 26 has a stem 30 projecting downwardly from it and passing through opening 21 in hub 20. A coiled spring 31 is disposed over stem 30 and extends between valve 26 and hub 20. The upper end of stem 27 is screw-threaded to receive a nut 32. A second valve stem 33, complementary to stem 27, traverses the top wall of chamber 11, and has a head 34 on its inner end for engagement with stem 27. The top wall of chamber 11 is provided with a stuffing box 35 through which the stem 33 passes. The mechanism for actuating valve 16 and its auxiliary valve 26, and for rotating the blower pipe 1 will now be described.

Two bearing brackets 36 and 37 project outwardly from the same side of the wall of chamber 9 in spaced relation. (Figs. 2 and 3) their bearings 36′, 37′ respectively being in alinement. A shaft 38 and sleeve 39 in assembled relation are mounted in these bearings 36′, 37′, the shaft having direct support in bearing 36′ at one end, the other end of the shaft being supported in the sleeve which is freely rotatable in bearing 37′. The sleeve 39 extends somewhat past the middle of shaft 38 and has a notch 40 formed at its inner end which cooperates in driving the shaft with a lug 41 projecting from the shaft into said notch. In order that the sleeve 39 may not travel longitudinally on shaft 38 a set screw 42 is passed through the bearing 37′ and enters an annular groove 43 formed in the sleeve. A driving pulley 44 is keyed onto the end of sleeve 39 which projects beyond the bearing 37′ and a worm 45 is feathered onto the sleeve just inside said bearing. A second and smaller worm 46 is keyed onto the shaft 38 just inside of the bearing 36′ and a collar 47 is secured to the shaft just outside said bearing. The worm 46 is directly beneath the blower pipe 1 and meshes with a worm-wheel 48 keyed onto said pipe so that any rotation imparted to the shaft 38 will be communicated to the blower pipe in the ratio of their respective gears.

The valve 16 for controlling the supply of steam to the blower pipe 1 is operated by the worm 45 on the sleeve 39. This worm has its first thread 45′ formed in the shape of a cam (see Fig. 6) which is arranged to engage the space between the two end teeth 49 formed on the head 50 of a valve actuating stem 51 when the respective parts are at rest and the blower pipe in its normal inoperative position. During the rotation of the worm 45, with sleeve 39, through its first quarter turn the cam thread 45′ will depress the stem 51 (Fig. 6) and since the balance of the worm threads constitute a normal worm gear a continuance of its rotation will cause it to travel over the teeth 49 of the head 50 keeping the stem 51 depressed.

By referring to Fig. 7 it will be observed that after the sleeve 39 has rotated slightly more than a quarter turn the face $a$ of recess 40 will abut the lug 41 on shaft 38 and cause the shaft to rotate with said sleeve, the worm 46, of course, rotating with the shaft. It will thus be seen that the worm 46 cannot begin to rotate until after worm 45 has made approximately a quarter turn during which quarter turn the stem 51 has been depressed.

The bottom of stem 51 fits into a cup 52 secured to the upper end of auxiliary valve stem 33 and when the stem 51 is depressed the stem 33 will be depressed with it and in turn the valve stem 27 which unseats valve 26 permitting steam from the supply pipe 3 to pass through hollow valve stem 17 into chamber 12. This steam exerts its pressure against the disc 18 so that there is an equal steam pressure on both sides of steam supply valve 16 thereby balancing said valve. As the stem 33 is further depressed the nut 32 will engage the guide arm 29 by means of which the main valve 16 is unseated. By the time the valve 16 is unseated to its full extent the sleeve 39 will have rotated sufficiently to pick up lug 41 and rotate the shaft 38 and worm 46 which in turn rotates the gear 48 and blower pipe 1. The blower pipe 1, if desired, may be rotated a full revolution during which time, as we have seen, the valve 16 will remain open. If less than a complete revolution is required, the arc of rotation may be fixed by the following device: A sleeve 53 is fixed onto the blower pipe 1 adjacent to the gear 48, and is provided with an annular groove 54 and a plurality of pairs of slots 55 transverse thereto. These slots 55 may be spaced at certain intervals so that they are 180° apart, or 90° etc. as desired. A stop member 56 is secured to the outer end of bearing 36′ and projects into the groove 54. Now if it is desired that the blower pipe make one complete revolution one pair of slots 55 has a stop bar 57 inserted into them. If a half revolution is required then two pairs of slots 180° apart would each be provided with a stop bar such as 57.

The operation of our improved soot blower may be described as follows:

The operator revolves the pulley 44 by pulling on chain C and, in so doing, rotates the worm 45 in the direction of the arrow (Fig. 6). During the first quarter turn of the worm its cam thread 45′ depresses stem 51 which in turn depresses stem 33 and valve stem 27, first opening auxiliary valve 26 to permit steam to enter chamber 12 which balances the main valve 16 making said valve 16 open easily as the stem 51 is further depressed as described above. Obviously steam will now flow into steam chamber 9 and blower pipe 1 discharging from the jet nozzles 1'. Up to this time the blower pipe 1 has not moved from its initial position. However, since the supply valve 16 is now fully open the blower pipe may be rotated which is accomplished by the end wall of notch 40 impinging on the lug 41 as explained above. The sleeve 39 and shaft 38 now rotate as a unit so that both worms 45 and 46 will rotate together. The continued rotation of worm 45 serves to hold the stem 51 down thus keeping supply valve 16 open, while the rotation of worm 46 drives the gear wheel 48 which rotates the blower element. When the blower element has been rotated to its full extent as determined by the stop 56 and stop bars 57, it will be rotated in the reverse direction, the supply valve 16 remaining open until the worm 45 has made its last quarter turn during which time head 50 of stem 51 will ride over the low place on cam 45' permitting the valve 16 to close under the influence of spring 31.

From the foregoing it is apparent that we have provided a soot blower that supplies a full head of steam during the entire blowing arc of the blower element the rotation of which is confined to this arc, and one that is simple and easy to operate.

Having described our invention, we claim:

1. In a soot blower for boilers, a rotatable blower unit, a steam supply pipe therefor, a valve for controlling the supply of steam to the blower unit, rotary means for controlling the opening and closing of said valve, separate means for rotating the blower unit, and means for coupling the valve-controlling rotary means with the blower unit rotating means by a continuance of the rotation of said rotary means after the valve has been unseated.

2. In a soot blower for boilers, a rotatable blower element, a steam supply pipe therefor, a valve for controlling the supply of steam to the blower element, means for rotating the blower element, means for opening said valve, a driving element for actuating the valve-opening means, and means on the driving element for operating the blower rotating means after said driving element has been moved to operate the valve-opening means.

3. In a soot blower for boilers, a rotatable blower element, a steam supply pipe therefor, a valve for controlling the supply of steam to the blower element, means for rotating the blower element, means for opening said valve, a driving element for actuating the valve-opening means, and means for automatically effecting a coupling between said driving element and said blower rotating means after said driving element has been moved to operate the valve-opening means.

4. In a soot blower for boilers, a rotatable blower element, a steam supply pipe therefor, a valve for controlling the supply of steam to the blower element, a rotatable driving element in operative relation with the valve stem, a shaft operatively associated with the blower element, and coupling elements on said shaft and driving element adapted to come into operative engagement on rotation of the driving element to an amount sufficient to effectively open the valve.

5. In a soot blower for boilers, a rotatable blower element, a steam supply pipe therefor, a valve for controlling the supply of steam to the blower element, and means for rotating the blower element, and means for operating said valve, the last mentioned means comprising a screw terminating in a cam operative on the valve to open same.

In testimony whereof we hereunto affix our signatures.

LEO JNO. BAYER.
FRANK A. BAYER.